United States Patent Office 2,776,265
Patented Jan. 1, 1957

2,776,265

PROCESS FOR BLOWING PLASTISOLS USING N,N'-DINITROSO-N,N'-DIMETHYL TEREPHTHALAMIDE AS THE BLOWING AGENT

Mack Francis Fuller, Woodbury, N. J., assignor to E. I. du Pont de Nemours and Company, Wilmington, Del., a corporation of Delaware No Drawing. Continuation of application Serial No. 291,305, June 2, 1952. This application April 9, 1954, Serial No. 422,267

5 Claims. (Cl. 260—2.5)

This invention relates to a novel and useful cellular composition and to a process for its preparation.

An object of the present invention is to prepare a novel and useful cellular composition. A further object of the invention is to provide a process for the manufacture of a novel and useful cellular composition.

This application is a continuation of my co-pending application Serial No. 291,305, filed June 2, 1952, now abandoned.

Various organic resins have been employed in the past as the basic ingredient for forming synthetic cellular compositions. Among these resins, the homopolymers and copolymers of vinyl chloride have proven highly successful. A plasticizer compound is generally added to the resin and the composition thus formed (with or without the addition of certain other additives such as stabilizers, resin extenders and the like) is foamed, either mechanically or chemically by the used of a chemical blowing agent. In the latter connection the blowing may be done under pressure or it may be done at atmospheric pressure conditions.

I have found that an extremely fine, uniform, color-free cellular composition may be produced by blowing a vinyl chloride homopolymer or copolymer with a blowing agent consisting primarily of N,N'-dinitroso-N,N'-dimethyl terephthalamide. My co-pending application Serial No. 316,076, filed October 21, 1952, discloses a suitable method for preparing the N,N'-dinitroso-N,N'-dimethyl terephthalamide which I utilize in the instant invention.

The following examples will illustrate the manner in which I use N,N'-dinitroso-N,N'-dimethyl terephthalamide to form my novel cellular composition in a pressure system and at atmospheric pressure conditions.

*Example 1*

The following ingredients were stirred together to form a plastisol:

| | Parts |
|---|---|
| Plastisol-grade polyvinyl chloride | 100 |
| Di-2-ethylhexylphthalate | 150 |
| Tribasic lead sulfate | 5 |
| Dibasic lead phthalate | 5 |
| N,N'-dinitroso-N,N'-dimethyl terephthalamide | 21 |

The plastisol was poured into a round mold ¼ of an inch deep and having an inner diameter of 3 inches. The mold was covered with a plate, clamped into a hydraulic press and heated for 5 minutes with 120 lbs. of steam (350° F.) in the platens. The mold was cooled to room temperature and then opened. The partially expanded disc was placed in a vessel of boiling water for 20 minutes. The resultant composition was a white, odorless sponge having an extremely fine, uniform cell structure, a density of 6.24 lbs. per cu. ft., and a Shore "A" durometer hardness of 5 (at 0 time).

*Example 2*

A granular composition was formed by blending together on a 2-roll mill at room temperature the following ingredients:

| | Parts |
|---|---|
| Plastisol-grade polyvinyl chloride | 100 |
| Di-2-ethylhexylphthalate | 15 |
| Tribasic lead sulfate | 5 |
| Dibasic lead phthalate | 5 |
| N,N'-dinitroso-N,N'-dimethyl terephthalamide | 21 |

The granular composition thus formed was pressed into a mold ¼ of an inch deep and having an inner diameter of 3 inches to form a dense cake. The mold was covered with a plate clamped in a hydraulic press, heated for 2 minutes with 120 lbs. of steam. The cake was then cooled for a period of 5 minutes, heated for an additional 5 minutes with 120 lbs. of steam, and then was cooled to room temperature. The mold was opened and the composition was expanded by heating in a circulating-air oven at 100° C. for 20 minutes. The resulting composition was a white, odorless sponge having a fine uniform cell structure, a density of 6.64 lbs. per cu. ft., and a Shore "A" durometer hardness of 72 (at 0 time).

*Example 3*

The following ingredients were stirred together to form a plastisol:

| | Parts |
|---|---|
| Plastisol-grade polyvinyl chloride | 100 |
| Di-2-ethylhexylphthalate | 130 |
| Dibasic lead phosphite | 10 |
| N,N'-dinitroso-N,N'-dimethyl terephthalamide | 42 |

The plastisol was poured into a mold ¼ of an inch deep and having an inner diameter of 3 inches. The mold was covered with a plate clamped in a hydraulic press, heated for 5 minutes with 60 lbs. of steam and then heated for 5 additional minutes with 120 lbs. of steam. The mold was then cooled and opened. The partially expanded disc was heated for 15 minutes in a circulating-air oven at 116° C. The resulting composition was a white, odorless sponge having a fine, uniform cell structure and a density of 2.65 lbs. per cu. ft.

*Example 4*

A granular composition was formed by blending the following ingredients on a 2-roll mill at room temperature:

| | Parts |
|---|---|
| Plastisol-grade polyvinyl chloride | 100 |
| Di-2-ethylhexylphthalate | 30 |
| Dibasic lead phthalate | 6 |
| Tribasic lead sulfate | 6 |
| N,N'-dinitroso-N,N'-dimethyl terephthalamide | 21 |

The granular composition was pressed into a mold ¼ of an inch deep and having an inner diameter of 3 inches. The mold was covered with a plate, clamped in a hydraulic press, and heated for 15 minutes with 120 lbs. of steam. The mold was then cooled to room temperature and opened. The partially expanded composition was heated for about 1 hour in a circulating-air oven at 100° C. The resulting composition was a white, practically odorless sponge having an extremely fine, uniform cell structure, a density of 6.95 lbs./cu. ft., and a Shore "A" durometer hardness of 60 (at 0 time).

*Example 5*

The following ingredients were stirred together to form a plastisol:

| | Parts |
|---|---|
| Vinyl chloride/di-ethyl maleate (95/5) copolymer | 100 |
| Di-2-ethylhexylphthalate | 125 |
| Basic lead carbonate | 10 |
| N,N'-dinitroso-N,N'-dimethyl terephthalamide | 28 |

The plastisol was poured into a mold ¼ of an inch deep and having an inner diameter of 3 inches. The mold was clamped in a press and heated for 6 minutes with 120 lbs. of steam. The mold was cooled to room temperature and opened. The partially expanded composition was heated for 15 minutes in a circulating-air oven at 100° C. The resulting composition was a white, odorless sponge having a fine, uniform cell structure and a volume 16.4 times that of the original plastisol.

Example 6

A mixture was prepared by blending together on a 2-roll mill at room temperature the following ingredients:

| | Parts |
|---|---|
| Vinyl chloride/vinyl acetate copolymer (95/5) | 100 |
| Di-2-ethylhexylphthalate | 30 |
| Ferro 900 (epoxy resin stabilizer manufactured by the Ferro Corporation) | 2.7 |
| Calcium stearate | 0.3 |
| Zinc stearate | 2.7 |
| Magnesium oxide | 2.7 |
| N,N'-dinitroso-N,N'-dimethyl terephthalamide | 21 |

The resulting mixture as removed from the 2-roll mill was pressed into a mold 1¼ inches deep and having an inner diameter of 3 inches. The mold was clamped in a press, heated for 6 minutes with 120 lbs. of steam, cooled for 8 minutes and heated for an additional 15 minutes with 120 lbs. of steam. The press was opened and the partially expanded composition was heated for about 1 hour in a circulating-air oven. The resulting composition was a white, odorless sponge having a fine, uniform cell structure, a density of 6.9 lbs./cu. ft., and a Shore "A" durometer hardness of 60 (at 0 time).

Example 7

A plastisol was prepared by stirring together the following ingredients:

| | Parts |
|---|---|
| Plastisol-grade polyvinyl chloride | 100 |
| Tricresyl phosphate | 150 |
| Basic lead carbonate | 5 |
| N,N'-dinitroso-N,N'-dimethyl terephthalamide | 10 |

The plastisol was poured into a paper tray to a depth of 3/16 of an inch and heated in an oven at 100° C. for 30 minutes. The tray was then transferred to an oven at 150° C. and heated for 20 minutes. The expanded composition thus obtained was a white extremely fine-celled sponge, having a thickness of ½ an inch, approximately 2.66 times that of the original plastisol, and an open or continuous cell structure.

Example 8

A plastisol was prepared by stirring together the following ingredients:

| | Parts |
|---|---|
| Plastisol-grade polyvinyl chloride | 100 |
| Tricresyl phosphate | 40 |
| Di-2-ethylhexyl phthalate | 110 |
| Basic lead carbonate | 5 |
| N,N'-dinitroso-N,N'-dimethyl terephthalamide | 5 |

The plastisol was poured into a paper tray and heated as in Example 7. The expanded composition thus obtained was a uniform, fine-celled sponge, having a mild, non-objectionable odor, good resiliency, a volume three times that of the original plastisol, and an open or continuous cell structure.

Example 9

A plastisol was prepared by stirring together the following ingredients:

| | Parts |
|---|---|
| Plastisol-grade polyvinyl chloride | 100 |
| Di-2-ethylhexyl phthalate | 125 |
| Basic lead carbonate | 5 |
| N,N'-dinitroso-N,N'-dimethyl terephthalamide | 10 |

The plastisol was poured into a paper tray and heated as in Example 7. The expanded composition thus obtained was a very soft sponge having a volume 5.5 times that of the original plastisol and a coarse, uniform, continuous cell structure.

Example 10

A plastisol was prepared by stirring together the following ingredients:

| | Parts |
|---|---|
| Plastisol-grade polyvinyl chloride | 100 |
| Di-2-ethylhexyl phthalate | 125 |
| Basic lead carbonate | 5 |
| N,N'-dinitroso-N,N'-dimethyl terephthalamide | 2 |

The plastisol was poured into a paper tray and heated as in Example 7. The expanded composition thus obtained was a highly resilient sponge having a volume 2⅓ times that of the original plastisol and a very fine, uniform, continuous cell structure.

Example 11

A plastisol was prepared by stirring together the following ingredients:

| | Parts |
|---|---|
| Plastisol-grade polyvinyl chloride | 100 |
| Di-2-ethylhexyl phthalate | 125 |
| Basic lead carbonate | 5 |
| N,N'-dinitroso-N,N'-dimethyl terephthalamide | 5 |

The plastisol was poured into a paper tray and expanded as in Example 7. The expanded composition thus obtained had a volume 2¾ times that of the original plastisol and a medium-fine, uniform, continuous cell structure, white in color, and was free of objectionable odor.

Example 12

A plastisol was prepared by stirring together the following ingredients:

| | Parts |
|---|---|
| Plastisol-grade polyvinyl chloride | 100 |
| Di-2-ethylhexyl phthalate | 100 |
| Chlorinated paraffin (40% chlorine) | 50 |
| Basic lead carbonate | 5 |
| N,N'-dinitroso-N,N'-dimethyl terephthalamide | 10 |

The plastisol was poured into an open aluminum tray to a depth of ⅛ of an inch and heated in an oven at 100° C. for 30 minutes. The tray was then transferred to an oven at 150° C. and heated for 30 minutes. The expanded composition thus obtained was a white, tough, resilient sponge, which was 1 inch thick and free of objectionable odor, and had a fine, uniform, continuous cell structure.

Example 13

A plastisol was prepared by stirring together the following ingredients:

| | Parts |
|---|---|
| Plastisol-grade polyvinyl chloride | 100 |
| Di-2-ethylhexyl phthalate | 50 |
| Basic lead carbonate | 5 |

This plastisol was poured into a square tray 4 inches on a side to a depth of ¼ of an inch and heated in an oven at 150° C. for 5 minutes. The tray was cooled below 50° C. A plastisol formed as in Example 10 was poured on top of the solid vinyl sheet to a depth of 3/16 of an inch. The tray was heated first in an oven at 100° C., then in an oven at 150° C. The expanded composition thus obtained was similar to that obtained in Example 10 and was securely bonded to the solid vinyl sheet.

The foregoing examples illustrate techniques which may be used for manufacturing my new cellular composition when blowing homopolymers and copolymers of vinyl chloride with N,N'-dinitroso-N,N'-dimethyl terephthalamide in either a pressure system or a system which is operated at atmospheric pressure conditions. Examples 1 through 4 and 7 through 13 illustrate the use of the process when a vinyl chloride homopolymer resin is employed and Examples 5 and 6 illustrate the process when a vinyl chloride copolymer resin is employed. Examples 1 through 6 illustrate the blowing of the sponge under pressure and Examples 7 through 13 illustrate the blowing of the sponge at atmospheric pressure conditions. The latter produces open-cell sponge, while a pressure system results in sponge having a closed-cell structure. In all cases, the product is an exceptionally fine, uniform sponge which is colorless or substantially colorless and free of objectionable odor.

Many other modifications will be apparent to those skilled in the art without departing from the essence of my inventive concept. Therefore, I intend to be limited only by the scope of the following claims.

I claim:

1. The process of preparing a cellular composition which comprises mixing N,N'-dinitroso-N,N'-dimethyl terephthalamide, a plasticizer, and a resin selected from the class consisting of vinyl chloride homopolymers, vinyl chloride/vinyl acetate copolymers, and vinyl chloride/diethyl maleate copolymers, and heating the resultant mixture to decompose the N,N'-dinitroso-N,N'-dimethyl terephthalamide, expand the resin, and flux the resin with the plasticizer.

2. The process of claim 1 wherein the heating is conducted at superatmospheric pressure to produce a closed-cell product.

3. The process of preparing a cellular composition which comprises mixing N,N'-dinitroso-N,N'-dimethyl terephthalamide, a plasticizer, and a polyvinyl chloride resin, and heating the resultant mixture to decompose the N,N'-dinitroso-N,N'-dimethyl terephthalamide and flux the resin with the plasticizer.

4. The process of claim 3 wherein the heating is conducted at superatmospheric pressure to produce a closed-cell product.

5. The process of claim 3 wherein the heating is conducted at atmospheric pressure.

References Cited in the file of this patent

UNITED STATES PATENTS

| | | |
|---|---|---|
| 2,491,709 | Briggs et al. | Dec. 20, 1949 |
| 2,683,696 | Muller et al. | July 13, 1954 |